(12) United States Patent
McLemore (10) Patent No.: US 6,711,992 B1
(45) Date of Patent: Mar. 30, 2004

(54) FRYER, BOILER AND STEAMER COOKING APPARATUS

(76) Inventor: John D. McLemore, 105 Hickory Ct., Fortson, GA (US) 31906

( * ) Notice: Subject to any disclaimer, the term of this patent is extended or adjusted under 35 U.S.C. 154(b) by 60 days.

(21) Appl. No.: 10/005,311

(22) Filed: Dec. 7, 2001

Related U.S. Application Data (60) Provisional application No. 60/251,851, filed on Dec. 8, 2000.

(51) Int. Cl.$^7$ .................................................. A47J 37/12
(52) U.S. Cl. .............................. 99/413; 99/340; 99/339
(58) Field of Search .......................... 99/413, 414, 339, 99/340, 410

(56) References Cited

U.S. PATENT DOCUMENTS

| | | | |
|---|---|---|---|
| 211,076 A | * 12/1878 | Follett | 99/413 |
| 217,378 A | * 7/1879 | Hodges | 99/414 |
| 309,249 A | * 12/1884 | Rains | 99/413 |
| 1,272,222 A | 7/1918 | Clayton | |
| 1,445,788 A | 2/1923 | Millican | |
| 1,469,512 A | 10/1923 | Hutchison | |
| 2,342,067 A | 2/1944 | Turner | |
| 2,658,444 A | 11/1953 | Wheeler | |
| 2,926,595 A | 3/1960 | Hron | |
| 3,225,681 A | 12/1965 | Wells | |
| 3,789,822 A | 2/1974 | Schantz | |
| 3,845,702 A | 11/1974 | Mies | |
| 3,971,304 A | 7/1976 | Cvitkovich | |
| 3,998,144 A | 12/1976 | Curtis | |
| 4,140,049 A | 2/1979 | Stewart | |

(List continued on next page.)

FOREIGN PATENT DOCUMENTS

| | | |
|---|---|---|
| JP | 6-34096 | 2/1994 |
| JP | 10-225384 | 8/1998 |
| WO | WO 00/10440 | 3/2000 |

OTHER PUBLICATIONS

Brew Ware "How to Find, Adapt & Build Homebrewing Equipment", Karl F. Lutzen and Mark Stevens, pp. 73–80—1996 copyright notice.

Photo of Tony Chacheres "EZ–Drain Pot" packaging and pot first seen by Applicant for retail on Nov. 10, 2001 at Bass Pro Store (patent pending on box).

Paper from www.tonychacheres.com pulled from internet on Feb. 5, 2002 (4 pages).

Masterbuilt "Outdoor Cooking Made Simple" (22 pages)—date not available.

*Primary Examiner*—Reginald L. Alexander
(74) *Attorney, Agent, or Firm*—Smith, Gambrell & Russell LLP (57) ABSTRACT

A basket featuring a main body with a product capture reception area, a side wall, a bailing extension fixed to the side wall and a capture hook device fixed to the side wall. The capture hook device includes capture hook sections that are circumferentially spaced apart about the circumference of the main body of the basket and designed to engage a pot configured to receive the basket. In one embodiment, the basket capture hook device features a monolithic member with a common back wall that conforms to the curvature of the main body of the basket and from which common back wall the capture hook segments radially extend out from. In another embodiment, the capture hook segments are independent and separated circumferentially on the basket and designed to provide a locking function for a predetermined diameter reception pot. In a preferred embodiment, the basket is a turkey fryer basket and the capture hooks are of a material sufficient to support the weight of a previously oil immersed turkey and the basket includes drainage/steaming holes. The invention also includes a drain valve secured to the pot for drain off of cooking fluid. The combination of the basket capture device for drain off of cooking fluid and the drain thus provides a low mess cooking apparatus.

52 Claims, 6 Drawing Sheets

U.S. PATENT DOCUMENTS

| | | |
|---|---|---|
| 4,371,623 A | 2/1983 | Taylor |
| 4,420,006 A | 12/1983 | Moore et al. |
| 4,491,602 A | 1/1985 | Miller |
| 4,658,117 A | 4/1987 | Sayward, Jr. |
| 4,688,549 A | 8/1987 | Blankemeyer |
| 4,754,698 A | 7/1988 | Naish |
| 4,832,226 A | 5/1989 | Leon |
| 5,033,453 A | 7/1991 | Loyd et al. |
| 5,200,224 A | 4/1993 | Friedman |
| 5,209,218 A | 5/1993 | Daneshvar et al. |
| 5,301,604 A | 4/1994 | Takahashi |
| 5,560,284 A | 10/1996 | Weidman et al. |
| 5,651,905 A | 7/1997 | Thies et al. |
| 5,813,321 A | 9/1998 | Bourgeois |
| 5,896,810 A | 4/1999 | Barbour |
| 5,918,535 A * | 7/1999 | Moreau .................. 99/413 |
| 6,103,291 A * | 8/2000 | Fernandez Tapia ....... 99/340 X |
| 6,213,002 B1 | 4/2001 | Batten et al. |
| 6,269,737 B1 | 8/2001 | Rigney et al. |
| 6,314,869 B1 | 11/2001 | Bourgeois, Jr. |
| 6,446,545 B2 | 9/2002 | Rigney |
| 6,532,865 B1 | 3/2003 | Hoffman |
| 2001/0039884 A1 | 11/2001 | Backus et al. |
| 2001/0054358 A1 | 12/2001 | Rigney |
| 2002/0174776 A1 | 11/2002 | Nockermann et al. |
| 2003/0003209 A1 | 1/2003 | Rigney |
| 2003/0029323 A1 | 2/2003 | Ehlhardt et al. |

* cited by examiner

FRYER, BOILER AND STEAMER COOKING APPARATUS

The present application claims priority under 35 U.S.C. §119(e) to U.S. Application No. 60/251,851 filed on Dec. 8, 2000.

FIELD OF THE INVENTION

The present invention is directed at providing a cooking apparatus which is sufficiently versatile to enable deep frying large/heavy objects such as turkeys, while also providing for steaming and boiling of other food items without introducing added component requirements and the need to assemble multiple components. The present invention is also directed at facilitating the draining of cooking fluid from a cooking basket and/or a pot in which the cooking fluid is provided.

BACKGROUND OF THE INVENTION

There exist a variety of cookware, both indoor and outdoor, for deep frying, steaming and boiling food items. Deep frying large poultry items such as whole turkey with an outdoor cooking apparatus has gained in popularity as a way of cooking which is both quicker than baking and less susceptible to drying out the food. Outdoor cooking apparatus often include a stock pot which is received on a gas (e.g., propane) cooker stand. In deep frying a whole turkey, a pot that is sufficiently sized to receive a whole turkey is utilized in conjunction with a sufficient level of cooking oil. To avoid exposure to the oil (e.g. splashing or actual contact), turkey securement arrangements have been developed.

Examples of turkey securement arrangements for deep frying turkey cooking apparatus can be found in U.S. Pat. Nos. 5,896,810 and 5,813,321. U.S. Pat. No. 5,896,810 describes a perforated turkey support plate with underlying legs to lift the bottom of the supported turkey off the bottom of the pot and a central turkey skewer rod having an upper end lifting loop for hooking engagement with a grab hook. This cooking approach is limited to deep frying a skewered turkey slid down along the skewer rod. Thus, this device is one dimensional and does not provide a system which provides for steaming or boiling other types of food items (e.g., steaming shelled seafood). Also, having to skewer a turkey requires a large degree of undesirable food handling and can be difficult when dealing with a not entirely thawed turkey or one not having a sufficiently sized or oriented through passage.

The cooking apparatus in U.S. Pat. No. 5,813,321 is described as being capable of performing either a deep fat frying or steaming function. A frame structure having a turkey penetrator and a pair of vertical members for hook attachment is provided for lifting and dropping a turkey into the oil. To achieve the steaming function, a steamer plate is slid in position inside the vertical members and past a central opening in the plate which receives the turkey penetrator. Thus, while being suited for both steaming and deep frying, there is relied upon multiple components which leads to the potential difficulty of having all components available at the time of desired usage as well as undesirable assembly and disassembly requirements between usage.

As further described in the background portion of U.S. Pat. No. 5,896,810, conventional deep frying baskets generally have one or two handles located near the top edge of a mesh or perforated basket. U.S. Pat. No. 5,896,810, in adapting a skewering alternative to a conventional deep frying basket, points out that the conventional baskets are not appropriate for deep frying turkeys as they are often not strong enough to support a large turkey and the handles end up close to the hot oil which is dangerous in deep fat frying a turkey or the like. There is also often little peripheral room for manipulating such baskets as the stock pots are generally tall and of smaller diameter to facilitate meeting the oil level and cooker sizing requirements

GENERAL DESCRIPTION OF THE INVENTION

The present invention comprises a cooking apparatus that is particularly well suited for deep frying heavy objects such as a whole turkey and steaming and/or boiling smaller and/or larger food items.

The present invention is also directed at facilitating the draining of cooking fluid upon completion of deep fry or boiling or the proper positioning of a cooking basket during a steaming operation. The present invention is also directed at facilitating the drainage of cooking fluid from the pot holding the oil. One embodiment of the cooking apparatus of the present invention comprises a pot with diametrically opposed exterior handles and a lid with its own lid handle. The pot is of relatively large capacity (e.g., 10 to 50 qts. or more preferably 20 to 40 qts.) making it well suited for cooking large objects such as a turkey (e.g., a 10 or more pound turkey, including a 15 or 16 pound turkey, which represents a general upper range for preferred cooking turkey sizes).

The cooking apparatus of the present invention further comprises a multi-purpose basket that is sized for reception within the above noted cooking pot, and also has a sufficiently large periphery and depth to receive a large cooking turkey as described above (e.g., basket having an 8 to 12 inch diameter received in a pot having a diameter which provides ½ to 2½ inches of radial clearance relative to a central positioned basket and the interior surface of the cooking pot). This close radial relationship helps minimize the quantity of oil that needs to be placed in the pot to submerge the turkey.

As the basket is designed to provide for deep frying heavy objects such as a turkey (including the added weight associated with post cooking absorption of cooking oil) it is preferably formed of unitary metal structure with apertures formed therein and preferably not of low load wire or metal rod screen or mesh arrangements such as in conventional indoor deep fat fryers. Because of the heavy load possibility the basket is formed of relatively thick aluminum (e.g., at least 1.0 mm thick) material. To maintain sufficient strength there is a greater percentage of solid surface than open surface in the areas where apertures are provided. For example, 0.3 to 0.7 inch diameter holes with 0.7 to 1.5 inch minimum spacing between holes. A series of 0.5 inch holes with 0.9 inch minimum spacing covering all surfaces of the basket provides a good high strength/drain-steam arrangement.

The basket has a side wall that is of sufficient height to adequately retain a large turkey in position within the basket despite the turbulent effects of deep fat frying. For example, a height sufficient to extend to or past at least half the lower half of a large vertically oriented turkey in the basket (e.g., 6 to 16 inches) with a height ratio range of 2:8 to 5:8 relative to the cooking pot. A basket height as indicated is also well suited for steaming typical quantities of seafood such as clams and mussels. A basket height (main body) of about 7 to 10 inches which is sufficient to extend to between the ⅔ turkey height to the top of an average height large vertically oriented turkey, is a preferred basket height range for the present invention).

The basket also includes its own handle structure. In one embodiment of the invention, the handle structure includes a unitary U-shaped bailing handle having its free ends either pivotably or rigidly attached to an upper edge region of the basket. The height of the handle above the main body of the basket is preferably less than the height of the upper edge of the cooking pot relative to the upper edge of the main body. The free ends of the bailing handle are preferably permanently secured to the basket to avoid inadvertent (manual) detachment (e.g. a sufficiently closed loop arrangement or permanent weld or bulbous captured end). The bailing handle has a capture receptor in an upper region for facilitating placement and location of a grasping handle relative to the bailing handle structure. In one embodiment the capture recess is a centralized V-shaped or C-shaped bend region designed for facilitating a grasping hook capture relationship when using a unitary bailing handle. In another embodiment, the handle structure comprises a pair of upstanding (e.g. vertical) bars rigidly fixed to the basket's main body. Engagement means such as loops are provided at the free end of the diametrically opposed pair of upstanding bars. For this embodiment, the grasping handle comprises a U-shaped dual extension grasping hook arrangement which places two vertical hook extensions at the same diametrical spacing as the loops provided at the free ends of the upstanding bars.

The basket further comprises at least one drain/steamer capture device which comprises a hook or clamp arrangement supported on the upper edge of the main body of the basket (e.g., within the upper half of a basket side wall) and preferably with at least one capture device within the upper 20% of the basket's height. The drain/steamer capture device is preferably arranged 90° peripherally (e.g. circumferentially for a round basket) offset relative to a line extending through the bailing handle engagement points with the basket. The drain/steamer capture device is designed for providing a supporting/non-slide off relationship relative to the higher height cooking pot, which relationship can be established upon lifting the basket with the engaged grasp handle/bailing handle combination. The apertures in the basket are sufficient in number and placement to allow fluid drain off upon lifting the basket above an upper height of the cooking fluid (e.g., water or cooking oil) and steam entry. Apertures provided over the bottom and at least the lower half-height of the basket is preferred, with a full height extension of the holes over all the exposed area of the basket being more preferred. The holes are separated by sufficient material to provide the above noted high load capability (e.g. 20 lbs. or more) without material deflection.

The above noted generally transverse (70–100° offset) peripheral offset between the bailing handle engagement points and drain/steam capture device provides a desirable grasping/visibility relationship that allows for rapid lift up and side shift placement of the basket with drain/steam capture device. Also, the drain/steam capture device preferably has a pot rim capture width that provides for a minor tilting (1–25°) in the bottom edge of the basket to facilitating drain off of cooking fluid. This tilting also provides for the bottom edge of a basket to come in contact with an interior side wall of the preferred size pot for added stability (in conjunction with the capture device).

In an alternate embodiment of the invention the capture device has two (or more) capture devices with a second preferably diametrically opposed to the first end at a different height than the first. For example, if the first is within the top 20% of the basket, the second is placed within the top 50% and lower (from the basket's top edge) than the first. This provides added versatility to accommodate for different relative height spacing between the top of the cooking fluid and top of the pot. This also provides for added versatility as to accommodate different size pots (e.g., a 40 quart pot would have a different cooking fluid level to top of pot height value than a 30 quart pot of similar diameter).

In a first embodiment of the device the capture device is a monolithic drain and steamer hook device featuring a curved back wall secured (e.g., welded) to an upper external region of the perforated basket. The capture device further includes a pot upper edge contact portion that extends out radially away from the basket for a distance sufficiently to clear the thickness of the upper edge of (e.g., upper edge bead) the cooking pot and, more preferably, sufficient to provide the tilting relationship described above. To prevent the sliding off of the basket once placed into support contact with the upper edge of the cooking pot, a non-horizontal segment extends down from the radial outer end of the pot upper edge contact portion. The downwardly extending component has an interior surface and at least part of that interior surface contacts the upper edge of the pot as the basket tilts into contact position. There is also preferably a curvature in the downwardly extending component corresponding to the curvature of the back wall of the capture device (and also the basket's).

The capture device is formed of a sufficiently strong enough material (e.g. a steel material or aluminum material at least as thick as the basket's main body) relative to its configuration to fully support a basket containing a large turkey (e.g., 15 to 20 or more pounds either in a pre-cooked state or a post-cooked state with absorbed cooking oil).

In one embodiment the capture device is a monolithic drain and steamer hook device featuring a curved back wall and, extending off of the common back wall, a first capture hook segment featuring an upper (e.g., horizontal) segment for contact with the upper edge of the pot receiving the basket and a pair of second capture hook segments that are less horizontal than the first and designed to prevent a slide off situation with respect to the first capture hook segment. The second capture hook segments are also preferably vertically oriented when in use or oblique (preferably in toward the pot's outer wall with enough clearance to receive the upper edge region of the pot or of less clearance with an outward curved bottom region for allowing an initial snap fit relationship relative to the top head of the pot). The first capture hook segment interlinks the second capture hook section along a base region of the same so as to define a border region of a notch formed between the two first capture hook segments. This arrangement is advantageous in that it provides good curved pot upper edge conformance and avoids basket rocking, while facilitating manufacture of the drain and steam hook. That is, a single piece can be bent or formed to define the entire drain and steamer hook device and then secured and the capture hook segments readily conform to the curvature of the pot upon a bending of the back wall (i.e., upon a bending of the back wall the capture hook segments further separate outward relative to the central notch to go from a transverse to straight back wall to a transverse to the basket's curvature tangent relationship). In other words, due to a circumferential reconfiguring of the back wall to conform to the curvature of the basket main body, the second hook capture segments also assume a curvature by separating apart in the notch region to achieve a desired level of conformance to the curvature of the basket.

Preferably the capture hook segments are arranged such that the upper edge or curved bead of the pot comes in flush contact with the interior surface of the second hook capture segments. For instance, contact within a region extending from a central region of the interior surface of the second hook capture segments to the interior edge region of the second hook capture segments defining the notch there between. In this way capture device function as locking means in that they attach/conform to the upper edge of the pot in circumferentially spaced apart fashion to prevent not only radial sliding off but rocking of the basket in view of the above noted clamping point contact arrangement. By providing sufficient radial clearance between the first capture hook segment and thickness of the pots' upper edge, a tilting of the basket can be achieved to place the bottom edge of the basket in contact with the pot further enhances stability. The slot or notch extends between the interior side edges of the second capture hook segments as well as partially (e.g., 50% to 85% of the thickness) into the first capture hook segment to facilitate connection conformance during capture device attachment.

A preferred method of the present invention for forming the capture device is to form a cutout in a planar plate and then subjecting the cut plate to a die clamping operation. The bent plate is then bent to conform to the curvature of the basket either during or prior to a fastening operation (e.g. a welding operation).

In an alternate embodiment, the capture hook arrangement is different in that two independent capture hooks are involved with each having their own upper capture hook segment and the bent radially farthest out capture hook segment extending down. The individual capture hook segments are circumferentially spread apart (e.g., within a 4 inch end to end circumferential spacing) in similar fashion to the above described capture hook segments and have a similar radial extension for the first capture hook segments to provide the above noted clamp and lock function between the pair of independent capture hooks and the upper circumference of the pot. They are however less desirable from the above described embodiment due to increased component and manufacturing requirements.

The capture device thus provides a secure location for placement of a basket with a heavy load into supporting contact with the pot above the top level of the cooking fluid so the cooking fluid can drain before final removal of the cooked food. In addition, the capture device is multi-functional in that it also provides a steamer hook which allows the basket to be supported above a lower level of steam source cooking fluid.

DETAILED DESCRIPTION OF THE ILLUSTRATED EMBODIMENTS

Figures 3, 4, 5:
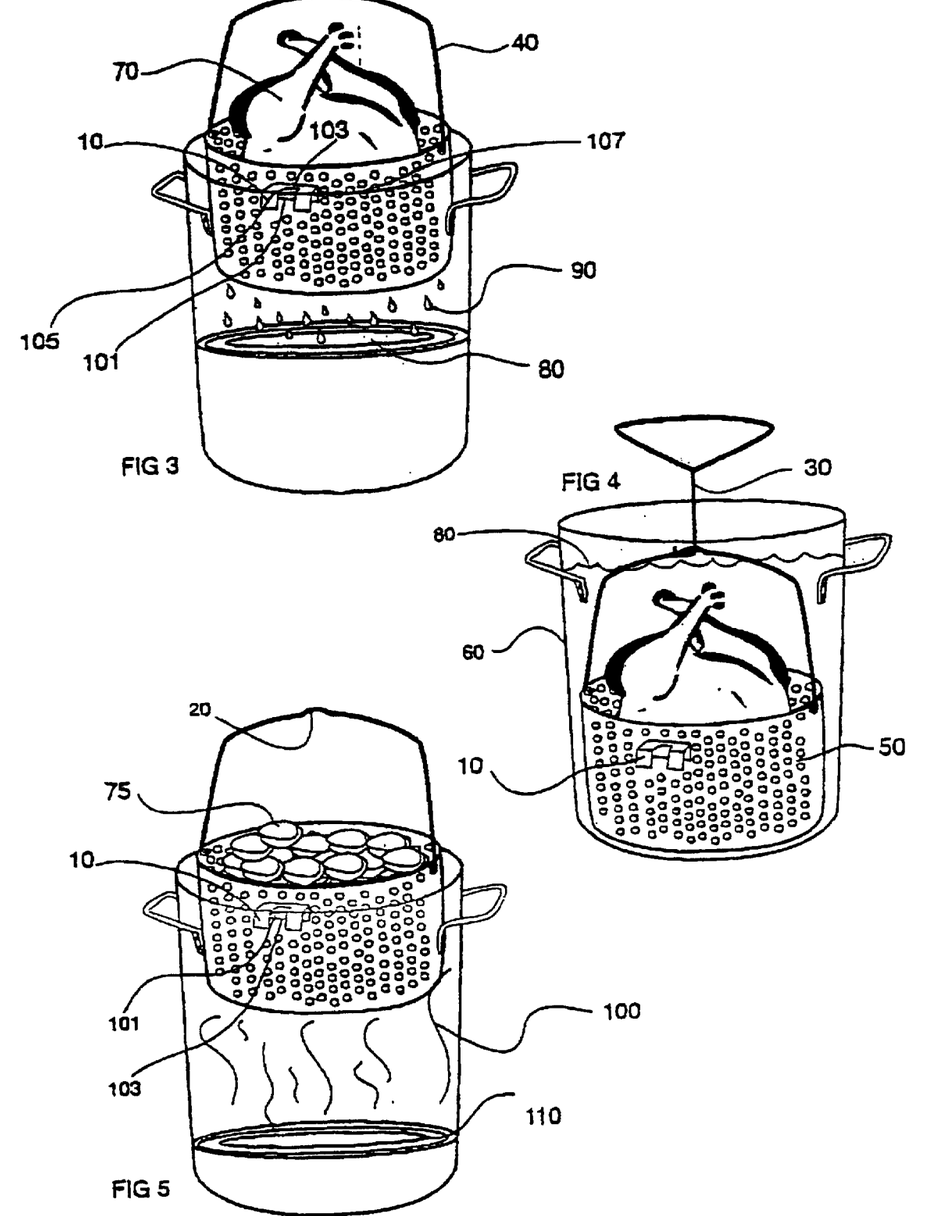
FIG. 3 shows a basket hooked onto the side of the pot draining a turkey
FIG. 4 shows a basket with turkey inside cooking pot being fried
FIG. 5 shows a basket hooked onto the side of the pot steaming clams

This invention is directed at a fryer, boiler and steamer cooking apparatus 1 comprising basket 50 with bailing handle and drain/steamer hook or capture device 10. As shown in FIGS. 1–5, drain and steamer hook or capture device 10 allows for the basket 50 to clip or hook to the side of cooking pot 60. Reference 30 is the grab hook used to lower and remove the main body of basket 50 from the cooking pot 60. Reference 40 is the bailing handle that is attached to the basket 50. FIG. 4 shows turkey 70 inside the basket ready for a deep oil fry while FIG. 5 shows clams 75 ready to steam.

As shown in FIGS. 3 and 4, the height of the basket is sufficient to cover more than the lower half of a vertically oriented turkey. FIG. 3 also shows oil level 80 after the basket is raised up and hooked onto the side of the cooking pot 60 while reference 90 shows the oil or water drippings from food back into the pot. Thus, there is avoided the dripping of oil or cooking fluid in removing the basket with cooked food from the pot. Reference 100 in FIG. 5 represents steam rising from water (cooking fluid) 110 when steaming seafood. While hooked, the bottom of the main body of the basket 112 is tilted such that the non-hooked side of the basket is below the horizontal so as to facilitate a more complete drain off of the cooking fluid.

Figures 6, 7:
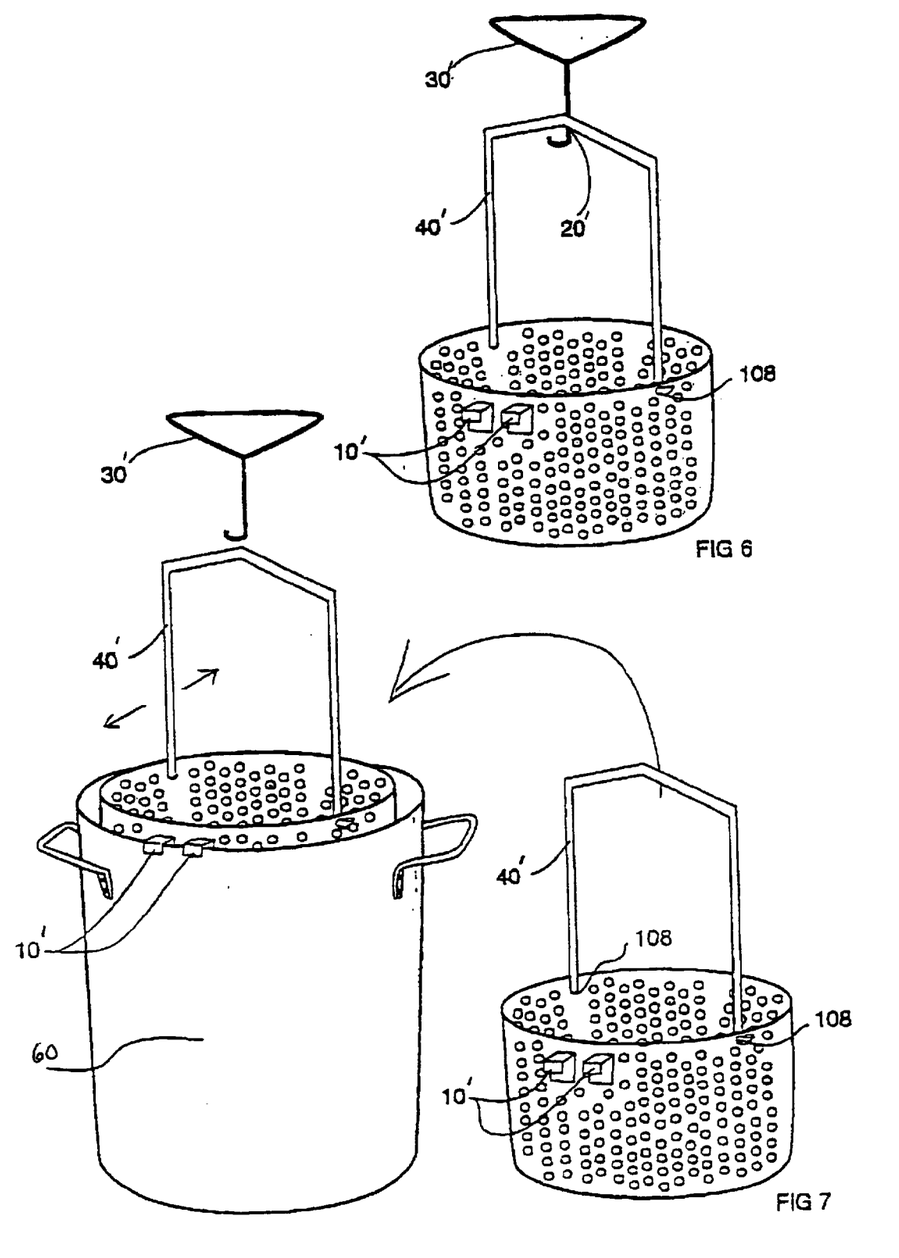
FIGS. 6 and 7 show an alternate embodiment of the present invention.

FIGS. 6 and 7 illustrate an alternate embodiment of the present invention which has somewhat similar features as that above described with the generally common components indicated by the same reference number with an added dash designation. Like the first embodiment, the FIG. 6 embodiment features a bailing handle 40' that is pivotably connected to reception holes in the basket as represented by reference number 108. The bailing handle 40' takes on a different configuration, however, with its vertical, parallel side extension and a straight triangular shaped cross over providing a grab hook reception area 20'.

Figure 1:
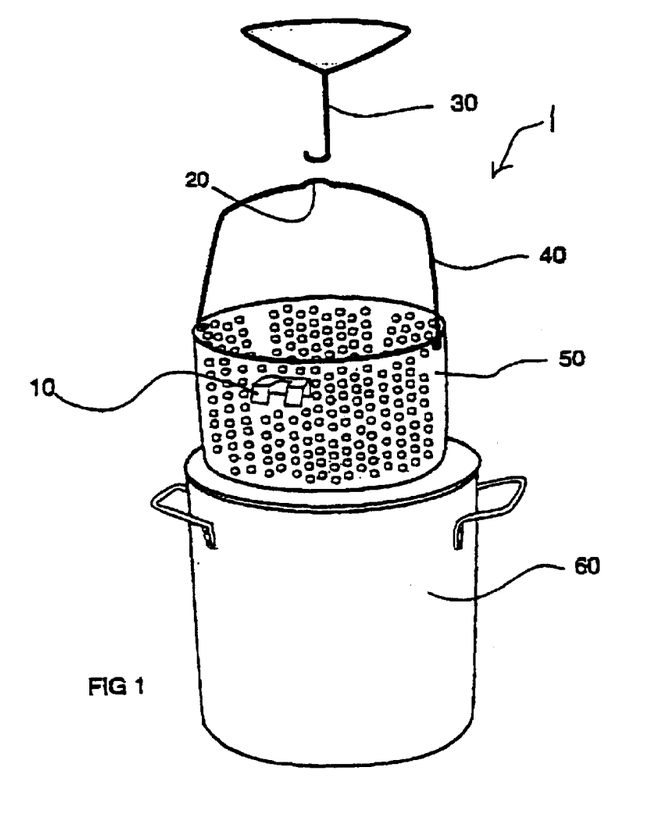
FIG. 1 shows a cooking pot, drain and steamer hook basket and grab hook combination
Figure 2:
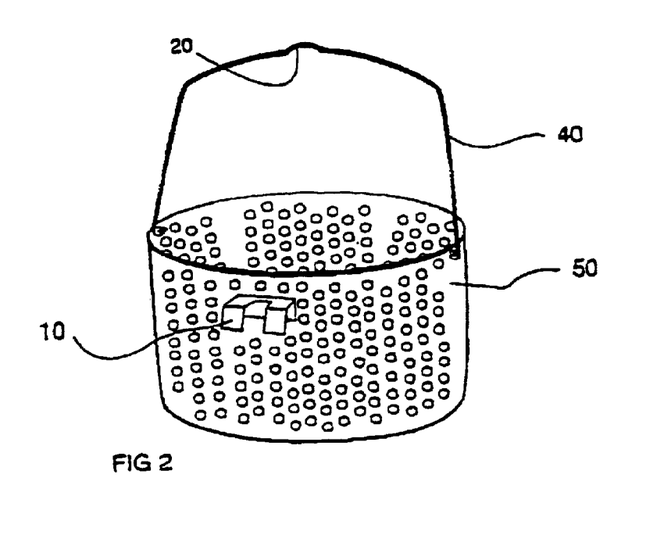
FIG. 2 shows a drain and steamer hook basket combination
Figures 10, 11, 12, 13, 14:
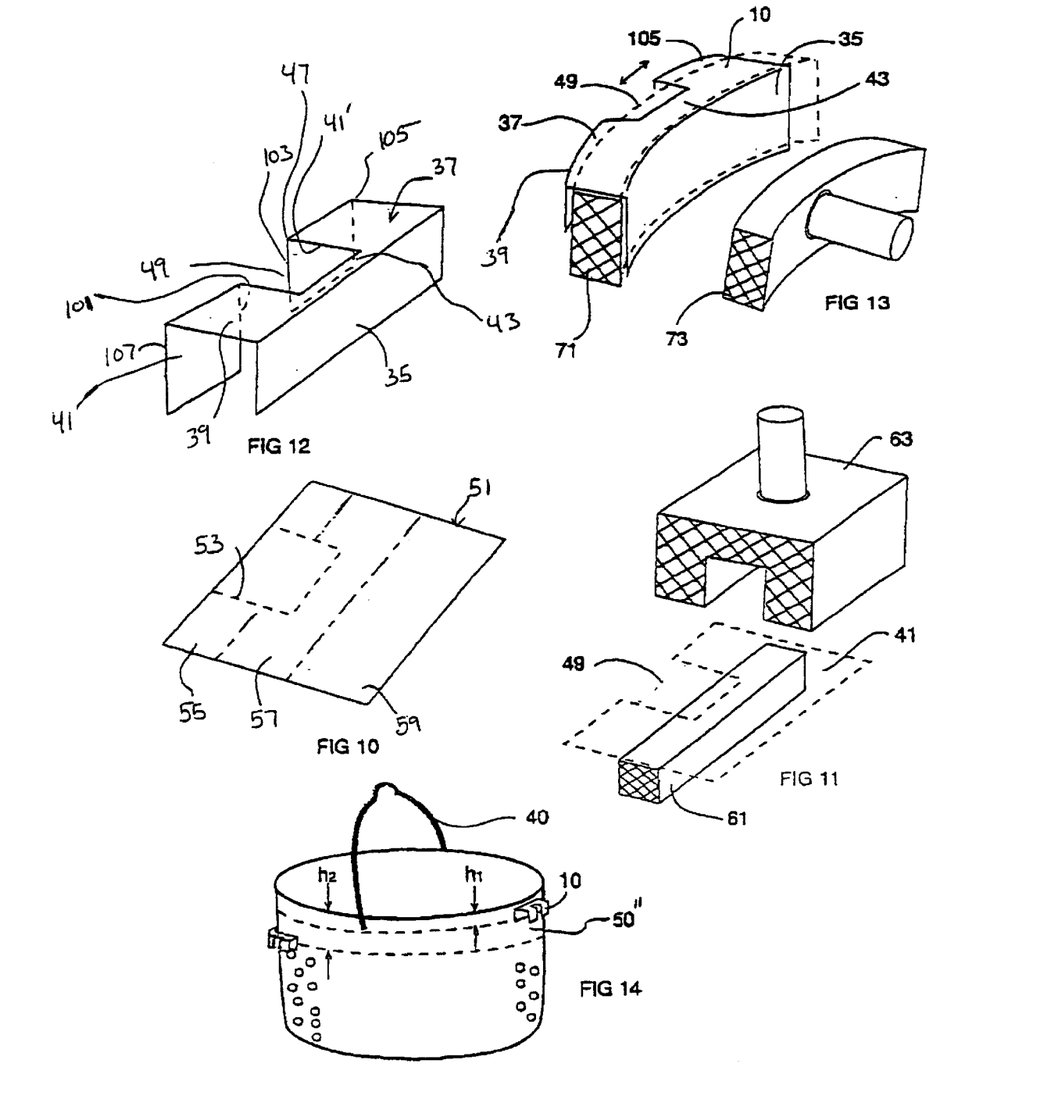
FIG. 10 shows a flat plate used for forming a capture device.
FIG. 11 shows a die operation for forming a bent plate configuration.
FIG. 12 shows the bent plate configuration produced by the die of FIG. 11.
FIG. 13 shows the bent plate configuration of FIG. 12 being subjected to a curving operation.
FIG. 14 shows an alternative basket embodiment featuring two capture devices at different height levels.

In the first described embodiment drain hook 10 is a monolithic drain and steamer hook device featuring a curved back wall welded or otherwise fixed to the exterior of the basket at a point below (e.g. ¼ inch to 2 inches) the upper edge of the basket and preferably at a location between the upper basket edge and above a ¾ height level of the basket. With reference to FIGS. 12 and 13, an enlarged view of capture device 10 in a pre-complete (FIG. 12) and post-complete (FIG. 15) state is provided. Extending off of the common back wall 35 is capture hook segment 37 featuring an upper (e.g. horizontal) segment 39 for contact with the upper edge of the pot receiving the basket and a pair of second hook segments 41, 41' that are less horizontal than the first and designed to prevent a slide off situation with respect to the first capture hook segment. The second capture hook segments are also preferably vertically oriented when in use or oblique preferably in toward the pot's outer wall with enough clearance to receive the upper edge region of the pot (or an outward curved bottom region for allowing a snap fit relationship). In addition, as part of the first capture hook segment 39, there is provided an integrating section 43 in the monolithic drain and steamer hook 10. Integrating section 43 defines an interior border region of notch 49 formed between the pair of second hook segments 41, 41'. The monolithic capture device arrangement shown in FIG. 1 is advantageous in that it provides good pot upper edge conformance and avoids basket rocking, while facilitating manufacture of the drain and steam hook in that a single piece can be bent or formed and then secured (e.g., an intermediate weld) and the capture hook segments readily conform to the curvature of the pot upon a bending of the back wall (i.e., upon a bending of the back wall the capture hook segments further separate outward in a "transverse to the basket curvature tangent" relationship). Due to an outward circumferential spreading of the hook capture segments with the back wall the hook segments are able to conform well to the curvature of the supporting pot. This arrangement also provides for small radial clearance (e.g., ½ inch to 2 inches) between a centered basket's main body and interior of a cooking pot. This facilitates the providing of lesser diameter cooking pots that lessen the oil purchase requirements (e.g. 26 qt. pot) and yet have sufficient volume and height for covering a large turkey under the upper level of the oil at least 3 inches clearance to the upper level of the cooking pot.

Preferably the capture hook segments are arranged such that the upper edge or curved bead of the pot comes in contact with the interior surface of the hook segments 41 such as in the area extending from interior edges 101 and 103 of defining notch 49 the hook segments to external edge 105 and 107. With this two area contact to circumferentially opposite sides of the slot or notch 49 in the capture device, the metal drain hook segments function as locking means in that they attach/conform to the upper edge of the pot to prevent rocking of the basket in view of the above noted clamping point contact arrangement and circumferential spacing. The heat resistant material chosen for the hook 10 (10' and 10") is preferably a significantly strong enough metal material able to handle (maintain its original orientation upon release) the industry considered maximum turkey weight following absorption of oil (actually preferably at least 1.5 times or more that weight). While extending down vertically in this embodiment the radial outer most section of the hooks can also slope inward toward the basket with preferably an added outward curved lower edge to facilitate rapid positioning.

The capture hook arrangement 10' in FIGS. 6 and 7 is different in that two independent capture hooks are involved with each having their own upper capture hook segment and the bent radially farthest out capture hook segment extending down. The individual capture hook segments are circumferentially spread apart in similar fashion to the above described capture hook segments and have a similar radial extension for the first capture hook segments to provide the above noted clamp and lock function between the pair of independent capture hooks and the upper circumference of the pot. A four inch (outer edge to outer edge) circumferential spreading is suitable and places each hook segment within a common quadrant of the supporting pot.

Figure 8:
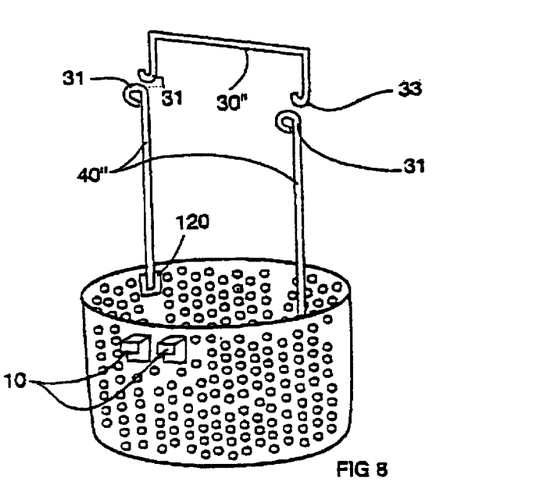
FIGS. 8 and 9 show another alternate embodiment of the present invention.
Figure 9:
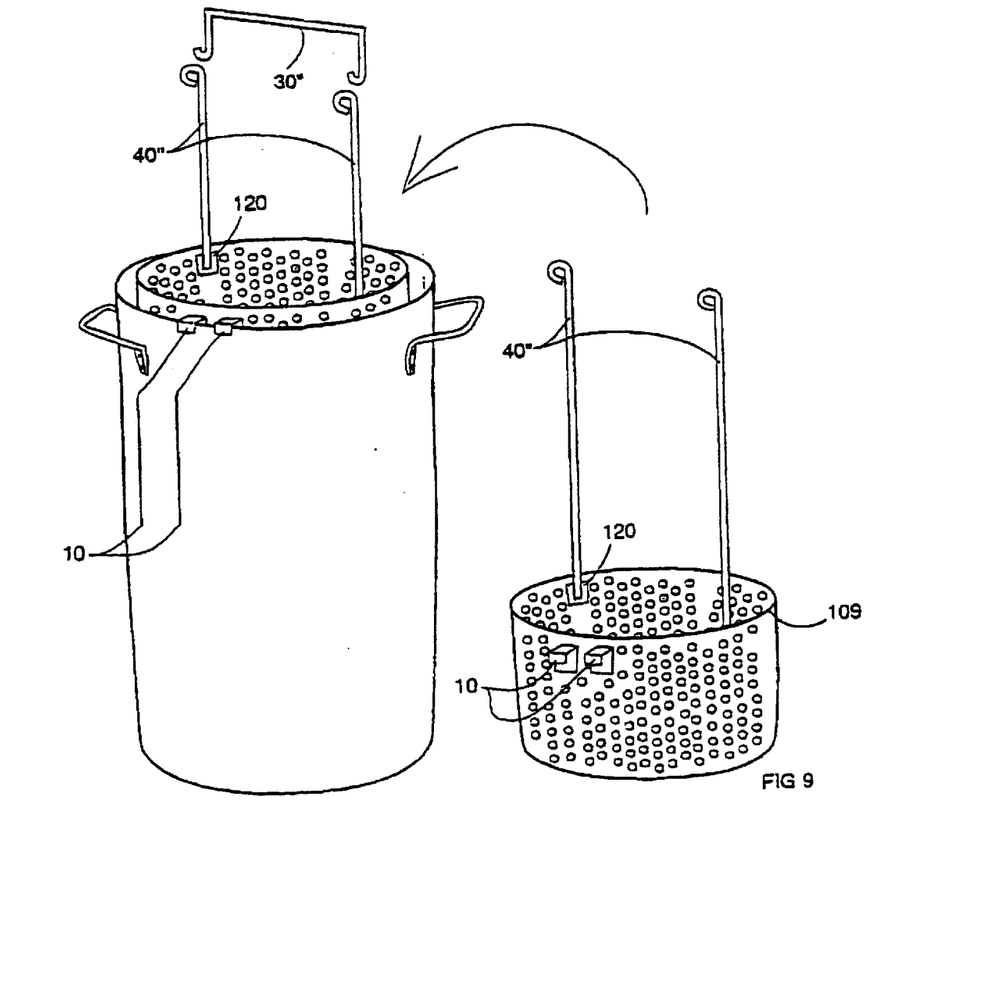

FIGS. 8 and 9 illustrate an alternate design of the present invention which includes rigid vertical bailing extensions (40") preferably fixed to the interior of the basket with fixation plates 120 which can be welded for example. The fixation points for both the pivoting and fixed ends of the bailing handles 40, 40' and 40" are preferably 90 degrees offset to either side of the preferably single side steamer and drain hook device 10, 10', 10" (unitary or two independent capture hook embodiments). The upper ends of bailing extensions 40" have reception loops 31 for receiving the corresponding reception hooks 33 on the vertical legs extending off the single horizontal interconnector bar of grasp hook 30". The embodiment in FIG. 8 also shows a beaded upper basket edge.

FIGS. 10–12 illustrate one example of forming the monolithic capture device 10 shown in FIG. 1. Flat plate 51 is shown in FIG. 10 with dash lines 53 showing the notch region to be removed. Also, FIG. 10 shows, with ghost lines, three equal area regions 55, 57, 59. As shown in FIG. 10, the notch 53 extends in the interior middle region of the plate as to entirely pass through region 55 and partially (e.g. 40% to 85%) through region 57.

FIG. 11 shows the plate 51 with cut-out 49 formed being subject to a die forming operation between male die member 61 and female die 63. Following movement of one or each relative to the other straight edge bent plate 37 is formed as shown in FIG. 12.

FIG. 13 illustrates a second die set 71 and 73 used to form the appropriate curvature in back wall 35 as well as the expanded notch 49 in so doing. Rather than the illustrated die 73, reliance can instead be placed upon the basket itself to which the conforming capture device is to be attached (with the corresponding curving die component being free or a component supporting a fastening means such as a spot weld head).

FIG. 14 illustrates an additional embodiment of the invention featuring the same boiling handle 40 and basket combination as before but with a pair of capture devices 10, 81 provided on the main body of the basket. As shown in FIG. 14, the two capture devices are secured to the basket at generally diametrically opposed locations (a preferred direct diametrical arrangement being preferred but not shown for greater visibility) and also at different height levels h1 and h2 with (h2–h1) preferably representing about a 1 inch to 4 inch difference. The difference in height provides for varying the relative height of the bottom of the basket 50" to the upper surface of the cooking fluid. This includes both the steaming cooking fluid level and also deep fry cooking oil levels which can vary depending upon how much oil is put in to deep fry and the dimensions of the cooking pot and the height of the turkey.

Figures 15, 16, 17:
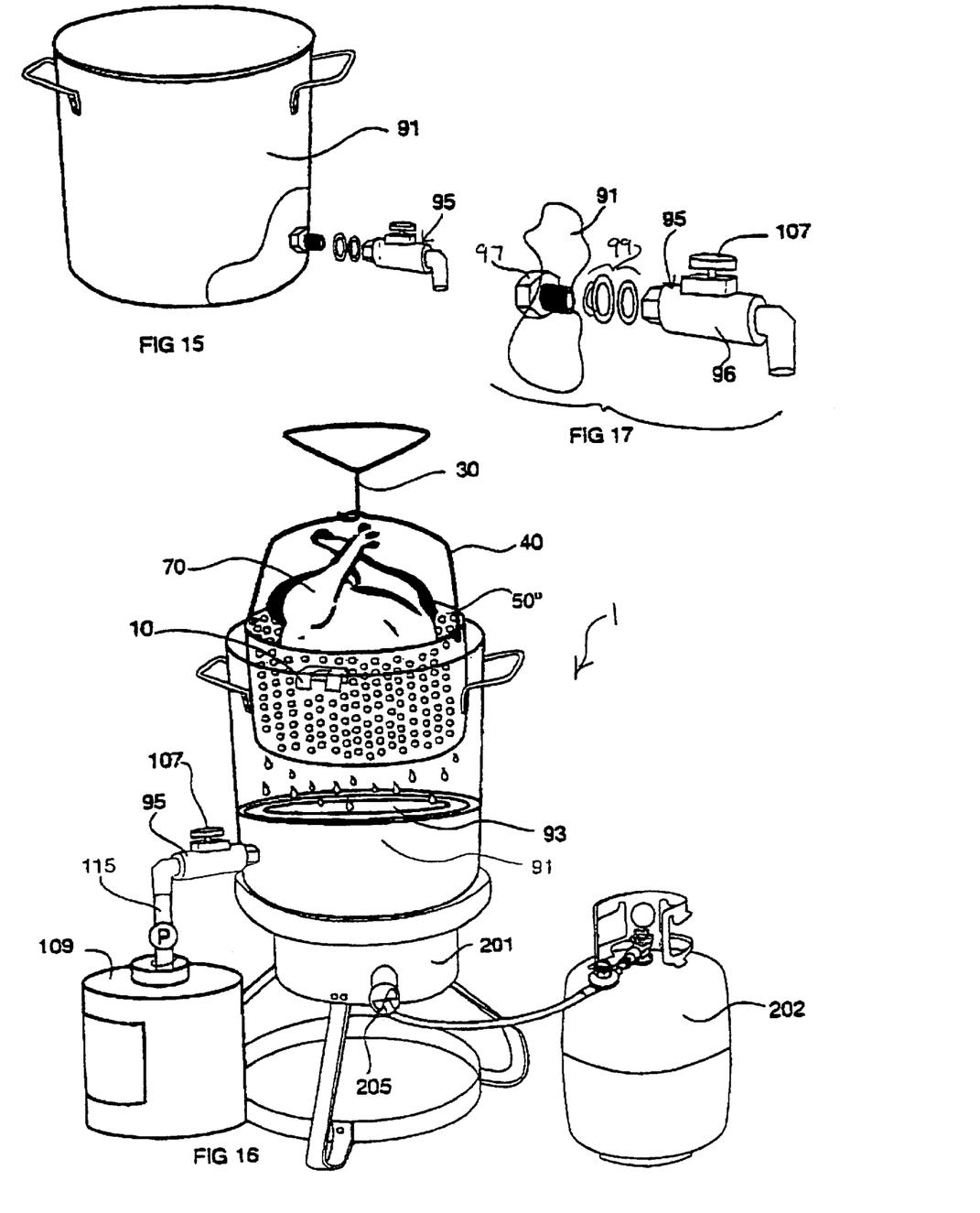
FIG. 15 shows an alternate embodiment of the present invention featuring a pot oil drain spigot.
FIG. 16 shows the pot of FIG. 15 on a cooking burner stand with propane source and with a drain receptacle.
FIG. 17 shows an enlarged view of the pot drain assembly.

FIG. 16 illustrates the basket in FIG. 14 supported on the upper edge of cooking pot 91 on the lower basket positioned capture device 81. As seen from FIG. 16, oil level 93 is just below the tilted bottom of basket 50", but sufficient enough to allow for the drain off of oil. Relative to this particular basket, pot and oil level arrangement, capture device 10 does not provide sufficient lift off of the basket bottom, but would provide a desirable height for steaming seafood or for a different pot/basket/oil level arrangement.

The capture device hooking of a basket allows for the drain off of cooking fluid including water used in boiling and cooking oil used in deep frying. Thus, there is avoided a mess of substantial cooking fluid dripping while avoiding the cook having to maintain a lifting position relative to a potentially heavy cooked food load such as a turkey.

FIGS. 15 and 16 illustrate a modified cooking apparatus 1' with pot 91 having a preferred embodiment of a cooking fluid drain off assembly 95. Drain-off assembly 95 is shown in FIG. 15 to be positioned close to the bottom of pot 51 (preferably as close as possible while taking into consideration structural clearance and any bottom curvature of the pot) such as within 1 or 2 inches above the bottom of the pot.

FIG. 17 illustrates drain off assembly 95 in this embodiment comprising ball valve 96 with on/off lever 107 (e.g. a ⅜" ball valve with ⅜" female pipe thread (FPT)). Compression adapter 97 (e.g. a ⅜" male pipe thread (MNT)×⅜" compression adapter) is threaded through a hole drilled into the pot such that the adapter nut is on the interior side of the pot. A set of metal/nylon/nylon washers 99 are then provided between the pot's exterior and around the threaded male member of the compression adapter which threads into the female threads of ball valve 96 to provide a sealed attachment when lever 107 is in closed position. While a ball valve arrangement works well in starting and stopping flow alternate flow/no flow drain means including other valve types and spigot arrangements can also be relied upon. Also, rather than reliance on fasteners like the washer and nuts shown in FIG. 15 a direct weld to provide a sealed drain off arrangement can also be relied upon. The above noted sizing is well suited for a drain off of oil although larger size drain conduits (e.g. 25% to 150% larger) can also be relied upon if more rapid drain off is desired. The material of the drain off assembly should be able to handle both cooled off and not-cooled off oil temperatures (e.g., up to 500 degrees Fahrenheit)

Drain off assembly 95 provides an additional means for avoiding a mess, particularly when dealing with cooking oil which can be difficult to wipe up and remove, and avoids the cooker having to tilt or lift heavy objects such as a 40 quart pot with 4 to 5 or so gallons of cooking oil. Thus, in combination with the drain off basket with capture device and drain off assembly 95 the drainage of cooking fluid is both made easier and less messy. An example of the combination is shown in FIG. 16 (although draining of the cooking oil is preferably carried out after the cooling of the cooking fluid, which is typically after removal of the basket following cooking oil drip off from the turkey shown). FIG. 16 also illustrates, cooker stand 201 with fuel supply (e.g. propane gas) 203 extending to burner 205 of the outdoor cooker stand 201.

FIG. 16 further shows lever 107 in an open position such that cooking fluid is free to pour out of pot 91 in free air flow down into a suitable receptacle (e.g. the original cooking oil 1 gallon jug—not shown). As also seen, the drain off assembly 95 is preferably generally 90° offset from the handle of the pot.

As an example of use of the combination illustrated in FIG. 16, an appropriate amount of cooking oil (e.g. enough to cover over the turkey once the basket is fully immersed) is placed into pot 91 with valve assembly 95 closed. The burner 201 is then turned on to raise the cooking oil to a desired cooking temperature (e.g. 350–375° F.). Once the cooking fluid reaches the desired temperature, the prepared (seasoned) turkey is placed in basket 50" and with the grasp hook 30 and bail handle, the turkey and basket are lowered into the state represented by FIG. 4. Upon passage of a suitable cooking time within the oil, the basket with turkey is raised with the grasp handle 30. The basket is then hooked to the side of the pot on a capture device (80 in the illustrated embodiment). After a short period (e.g. 30 seconds to 5 minutes), the cooking fluid has essentially dripped back into the pot from the basket and turkey. The basket with turkey is then moved to the desired turkey removal location and the turkey is removed from the basket. After a sufficient cooling period (e.g. a ½ hour to an hour), the oil in pot 91 is drained off by positioning a receptacle under valve assembly 95 and lever 107 is turned on to produce oil flow 111. The oil then drains until the receptacle is filled and the lever 107 is shut off to avoid any over fill. Additional receptacles are then filled in the above noted sequence until the oil level falls below the drain hole where upon there is little oil left allowing for easy tilting of the pot to complete drain off (either through the drain or out the open top of the pot). FIG. 16 also shows an alternate embodiment of drain off means which includes a sealable receptacle 109 that is sufficiently sized to accommodate a complete single receptacle drain off. Also, a conduit can be threaded to the end of valve assembly 95 for insertion into or threading onto receptacle 113 (thus providing a sealed system). To speed up the drain off time, a pump (P) (e.g. a drill operated pump) can be placed in line or in fluid communication with conduit 115 and/or a larger sized drain conduit utilized as there is no concern for overfill particularly with a threaded receptacle connection.

As can be seen with each illustrated basket there is provided drain/steam holes or apertures 120 over essentially all of the side and bottom wall surfaces, although other embodiments are considered under the present invention including baskets with only lower half apertures such as in the bottom only and/or the lower region of the side wall.

It will be understood that the embodiments shown and the procedures set forth above are intended to be illustrative only and are not intended as limiting the scope of this invention, it being intended that all equivalents thereof be included in the scope of the appended claims.

What is claimed is:

1. A deep fat fryer/steamer combination cooking apparatus comprising:
a deep fat fryer/steamer combination basket having a basket main body with a bottom and side wall and with apertures formed in the bottom and side wall, a bailing handle structure engaged with said basket main body, a drain/steamer capture device supported by said main body, said drain/steamer capture device being configured for engagement with an upper edge of a cooking pot when in use and being of sufficient strength to support a 20 pound load weight, and wherein said capture device has a radial extension that provides for placement of said basket within the cooking pot in a cooking mode with said radial extension being free of contact with said pot.

2. The cooking apparatus according to claim 1 wherein said drain/steamer capture device includes a monolithic hook having circumferentially separate first and second hook sections.

3. The cooking apparatus as recited in claim 1 wherein said drain/steamer capture device is formed of a material of greater load strength than a material of the basket.

4. The cooking apparatus as recited in claim 1 wherein said capture device features a basket engagement wall, an upper wall section extending radially out from the engagement wall, and a pair of hook segments extending down from the upper section.

5. The cooking apparatus as recited in claim 1 further comprising a cooking pot having a bottom and side wall with the side wall of said basket having a height representing ⅖ to ⅝ of a vertical height of the side wall of said pot.

6. The cooking apparatus as recited in claim 1 wherein said capture device is generally transversally circumferentially offset from a diametrical line extending through contact points of said bailing handle structure with said main body.

7. The cooking apparatus as recited in claim 6 wherein there is only a single capture device supported by the side wall of the basket.

8. The cooking apparatus of claim 7 wherein said capture device is of sufficient strength to maintain an original pre-load orientation when subject to a 16 lb load weight.

9. The cooking apparatus as recited in claim 1 wherein the capture device is positioned vertically below in height level an engagement point of said bailing handle structure with said main body.

10. The cooking apparatus as recited in claim 1 wherein said bailing handle structure is a monolithic device having free ends pivotally supported by said main body and a grasping hook receptor.

11. The cooking apparatus as recited in claim 1 comprising at least a pair of capture devices with one positioned at a different height relative to the main body of the basket.

12. The cooking apparatus of claim 1, wherein said capture device is non-releasably secured to said basket.

13. The apparatus as recited in claim 1 wherein said capture device is configured such that when said capture device is engaged with an upper edge of the pot, a portion of the basket diametrically opposite to said capture device is free from contact with the pot.

14. The apparatus as recited in claim 1 wherein said capture device is entirely positioned within an upper quarter height portion of said basket.

15. A deep fat fryer/steamer combination cooking apparatus comprising:
a deep fat fryer/steamer combination basket having a basket main body with a bottom end side wall and with apertures formed in the bottom and side wall, a bailing handle structure engaged with said basket main body, a drain/steamer capture device supported by said main body, said drain/steamer capture device being configured for engagement with an upper edge of a cooking pot when in use and being of sufficient strength to support a 20 pound load weight, and
further comprising a cooking pot having a flow/no-flow drain off device.

16. A deep fat fryer/steamer combination cooking apparatus, comprising
a pot with a bottom and side wall;
a deep fat fryer/steamer combination basket having:
(i) a basket main body with a basket bottom and a basket side wall, and drain apertures formed therein,
(ii) a drain/steamer capture device secured to said basket main body and having at least one upper hook segment positioned for contact with an upper edge of said pot when in a drain mode and a second hook segment extending down off from said upper hook segment and wherein said upper hook segment has a radial extension that provides for placement of said basket in a cooking mode within said pot with said capture device free of contact with said pot, and
(iii) a bailing handle structure engaged with said basket main body.

17. The apparatus as recited in claim 16 wherein said bailing handle structure includes a bent bar secured at opposite ends to said basket main body.

18. The apparatus as recited in claim 17 wherein said bailing handle comprises grasp hook reception means.

19. The apparatus as recited in claim 16 wherein said pot has at least a 20 quart capacity, and said main body of the basket having a height between ⅖ to ⅝ of that of said pot and a diameter of within 1.0 inch to 2 inches of that said pot.

20. The apparatus as recited in claim 16 wherein said drain/steamer capture device includes a monolithic hook having circumferentially separate first and second hook sections.

21. The apparatus of claim 16 further comprising
a drain off valve supported by said pot and positioned for draining cooking fluid from said pot.

22. The apparatus of claim 21 wherein said valve includes a handle which is manually movable from an on to an off position.

23. A method of manufacturing the apparatus of claim 21 comprising attaching the bailing handle and the capture device to the main body of the basket and attaching a drain off valve to said pot.

24. A deep fat fryer/steamer combination cooking apparatus, comprising:
a pot with a bottom and side wall;
a deep fat fryer/steamer combination basket having:
(i) a basket main body with a basket bottom and a basket side wall, and drain apertures formed therein,
(ii) a drain/steamer capture device secured to said basket main body and having at least one upper hook segment positioned for contact with an upper edge of said pot when in a drain mode and a second hook segment extending down off from said upper hook segment and wherein said upper hook segment has a radial extension that provides for placement of said basket in a cooking mode within said pot free of capture device contact with said pot and
(iii) a bailing handle structure engaged with said basket main body;
a drain off valve supported by said pot and positioned for draining cooking fluid from said pot,
wherein said valve includes a handle which is manually movable from an on to an off position, and
a conduit in fluid communication with said drain and a receptacle to receive drained cooking fluid passing through said conduit.

25. The apparatus of claim 24 wherein said conduit is flexible and in a sealed relationship with said receptacle in operation.

26. A method of deep frying at least a 10 pound turkey, comprising:
heating cooking fluid in a pot;
inserting a turkey into the basket;
inserting the basket with turkey into the cooking fluid;
lifting the basket with turkey up while within the pot by grasping of a bail handle structure supported by the main body of the basket;
engaging a drain/steamer capture device attached to a main body of said basket such that said drain/steamer capture device contacts said pot, said method further comprising draining cooking oil from said pot by opening a drain valve supported by said pot.

27. The method of claim 26 wherein engaging said drain steamer device tilts said basket main body so as to facilitate drainage of oil from the turkey and basket.

28. The method of claim 26 further comprising engaging said capture device by positioning a hook shaped extension of said capture device over an upper edge of said pot.

29. The method of claim 26 wherein said capture device is non-releasably secured to said main body and is placed in supporting contact with an upper edge of said pot when engaged with said pot.

30. The method of claim 26 wherein said capture device and basket are positioned entirely with the pot while the turkey is subjected to the cooking fluid.

31. The method of claim 26 wherein the draining of cooking oil from the pot is carried out after engaging said capture device and allowing for a period of cooking fluid drip off from the turkey.

32. A deep fat fryer/steamer combination cooking apparatus comprising:
   a deep fat fryer/steamer combination basket having a basket main body with a bottom and side wall and with apertures formed in the bottom and side wall, a bailing handle structure engaged with said basket main body and having a grasp hook capture portion, a drain/steamer capture device supported by said main body, said drain/steamer capture device being configured for engagement with an upper edge of a cooking pot when in use and being of sufficient strength to support a 20 pound load weight, and
   wherein said drain/steamer capture device includes a monolithic hook having circumferentially separate first and second hook sections.

33. A method of manufacturing the apparatus of claim 32 comprising:
   manipulating a straight version of said drain/steamer capture device such that a back wall of said drain/steamer capture device is curved to better conform to the basket main body and interior edges of said first and second hook segments further separate, and securing said back wall to said basket main body; and providing the bailing handle structure to said basket main body.

34. The method of claim 33 wherein manipulating the drain steamer capture device includes bending the drain/steamer capture device such that a notch formed in a common upper capture device segment off from which the first and second hook segments extends, expands circumferentially apart.

35. A deep fat fryer/steamer combination cooking apparatus comprising:
   a deep fat fryer/steamer combination basket having a basket main body with a bottom and side wall and with apertures formed in the bottom and side wall, a bailing handle structure engaged with said basket main body and having a grasp hook capture portion, a drain/steamer capture device supported by said main body, said drain/steamer capture device being configured for engagement with an upper edge of a cooking pot when in use and being of sufficient strength to support a 20 pound load weight, and
   wherein said drain/steamer capture device is formed of a material of greater load strength than a material of the basket.

36. A deep fat fryer/steamer combination cooking apparatus comprising:
   a deep fat fryer/steamer combination basket having a basket main body with a bottom and side wall and with apertures formed in the bottom and side wall, a bailing handle structure engaged with said basket main body and having a grasp hook capture portion, a drain/steamer capture device supported by said main body, said drain/steamer capture device being configured for engagement with an upper edge of a cooking pot when in use and being of sufficient strength to support a 20 pound load weight, and
   wherein said capture device features a basket engagement wall, an upper wall section extending radially out from the engagement wall, and a pair of hook segments extending down from the upper section.

37. The cooking apparatus as recited in claim 36 wherein said upper section has an intermediate notch section formed therein which is further defined by interior side edges of said pair of hook segments.

38. The cooking apparatus as recited in claim 37 wherein said notch extends for more than 50% of an intermediate region of said upper section.

39. A deep fat fryer/steamer combination cooking apparatus comprising:
   a deep fat fryer/steamer combination basket having a basket main body with a bottom and side wall and with apertures formed in the bottom and side wall, a bailing handle structure engaged with said basket main body and having a grasp hook capture portion, a drain/steamer capture device supported by said main body, said drain/steamer capture device being configured for engagement with an upper edge of a cooking pot when in use and being of sufficient strength to support a 20 pound load weight,
   wherein said capture device is generally transversally circumferentially offset from a diametrical line extending through contact points of said bailing handle structure with said main body, and
   wherein there is only a single capture device supported by the side wall of the basket.

40. A deep fat fryer/steamer combination cooking apparatus comprising:
   a deep fat fryer/steamer combination basket having a basket main body with a bottom and side wall and with apertures formed in the bottom and side wall, a bailing handle structure engaged with said basket main body and having a grasp hook capture portion, a drain/steamer capture device supported by said main body, said drain/steamer capture device being configured for engagement with an upper edge of a cooking pot when in use and being of sufficient strength to support a 20 pound load weight, and
   at least a pair of capture devices with one positioned at a different height relative to the main body of the basket.

41. The cooking apparatus as recited in claim 40 wherein the pair of capture devices are circumferentially offset.

42. A deep fat fryer/steamer combination cooking apparatus, comprising
   a pot with a bottom and side wall;
   a deep fat fryer/steamer combination basket having:
      (i) a basket main body with a basket bottom and a basket side wall, and drain apertures formed therein,
      (ii) a drain/steamer capture device secured to said basket main body and having at least one upper hook segment positioned for contact with an upper edge of said pot when in a drain mode and a second hook segment extending down off from said upper hook segment and
      (iii) a bailing handle structure engaged with said basket main body,
   wherein said bailing handle structure includes a bent bar secured at opposite ends to said basket main body, and
   wherein said bailing handle comprises grasp hook reception means.

43. A deep fat fryer/steamer combination cooking apparatus, comprising
   a pot with a bottom and side wall;
   a deep fat fryer/steamer combination basket having:
      (i) a basket main body with a basket bottom and a basket side wall, and drain apertures formed therein,
      (ii) a drain/steamer capture device secured to said basket main body and having at least one upper hook segment positioned for contact with an upper edge of said pot when in a drain mode and a second hook segment extending down off from said upper hook segment and (iii) a bailing handle structure engaged with said basket main body, wherein said drain/steamer capture device includes a monolithic hook having circumferentially separate first and second hook sections.

44. The apparatus as recited in claim 43 wherein said upper hook segment has an intermediate notch section formed therein which is further defined by interior side edges of said pair of hook section.

45. A deep fat fryer/steamer combination cooking apparatus, comprising a pot with a bottom and side wall;

a deep fat fryer/steamer combination basket having:
  (i) a basket main body with a basket bottom and a basket side wall, and drain apertures formed in said basket,
  (ii) a drain/steamer capture device secured to said basket main body and having at least one upper hook segment positioned for contact with an upper edge of said pot when in a drain mode and a second hook segment extending down off from said upper hook segment, and
  (iii) a bailing handle structure engaged with said basket main body; and a drain off valve supported by said pot and positioned for draining cooking fluid from said pot.

46. The apparatus as recited in claim 45 wherein said pot includes a cylindrical wall section extending up from said bottom and in which said drain off valve is supported.

47. The apparatus as recited in claim 46 wherein said drain off valve is positioned within two inches from the bottom of said pot.

48. The apparatus as recited in claim 45 further comprising an outdoor cooker dimensioned for supporting said pot.

49. The cooking apparatus as recited in claim 45 wherein said capture device maintains an original configuration when the basket is supporting a 20 lb load.

50. The cooking apparatus as recited in claim 45 wherein said cooking apparatus is a turkey fryer apparatus with said basket designed to support at least a 16 lb turkey.

51. The apparatus as recited in claim 45 wherein said capture device is fixed by a weld bond with said basket.

52. The apparatus as recited in claim 45 wherein said bailing handle has a grabbing device receptor formed in said bailing handle.

* * * * *